(12) United States Patent
Dumbaugh

(10) Patent No.: US 6,851,548 B1
(45) Date of Patent: Feb. 8, 2005

(54) VIBRATORY CONVEYING APPARATUS ADAPTED TO BE DRIVEN BY A PLURALITY OF ACCUMULATIVELY PHASED PAIRS OF ROTATING ECCENTRIC WEIGHTS

(75) Inventor: George D. Dumbaugh, Louisville, KY (US)

(73) Assignee: Kinergy Corporation, Louisville, KY (US)

( * ) Notice: Subject to any disclaimer, the term of this patent is extended or adjusted under 35 U.S.C. 154(b) by 0 days.

(21) Appl. No.: 09/625,421

(22) Filed: Jul. 25, 2000

Related U.S. Application Data

(60) Provisional application No. 60/146,462, filed on Jul. 30, 1999.

(51) Int. Cl.[7] .............................................. B65G 27/20
(52) U.S. Cl. ...................................... 198/770; 198/758
(58) Field of Search ................................ 198/770, 763, 198/758

(56) References Cited

U.S. PATENT DOCUMENTS

| | | |
|---|---|---|
| 2,830,696 A | 4/1958 | Musschoot |
| 3,053,379 A | 9/1962 | Roder et al. |
| 3,178,068 A | 4/1965 | Dumbaugh |
| 3,251,457 A | 5/1966 | Dumbaugh |
| 3,254,879 A | 6/1966 | Carrier, Jr. |
| 3,407,670 A * | 10/1968 | Venanzetti ...................... 74/61 |
| 3,659,465 A | 5/1972 | Oshima et al. |
| 3,744,676 A | 7/1973 | Dumbaugh |
| 4,015,705 A | 4/1977 | Dumbaugh |
| 4,149,627 A | 4/1979 | Dumbaugh et al. |
| 4,180,458 A | 12/1979 | Shahan |
| 4,255,254 A | 3/1981 | Faust et al. |
| 4,826,017 A | 5/1989 | Du Bourg et al. |
| 4,979,608 A * | 12/1990 | Mikata et al. ............... 198/566 |
| 5,392,898 A | 2/1995 | Burgess et al. ............. 198/750 |
| 5,615,763 A | 4/1997 | Schieber ...................... 198/751 |
| 6,024,210 A * | 2/2000 | Rosenstrom ................ 198/758 |

FOREIGN PATENT DOCUMENTS

WO    WO 99/28218    6/1999

* cited by examiner

Primary Examiner—Douglas C. Butler
Assistant Examiner—Bradley T King
(74) Attorney, Agent, or Firm—Barnes & Thornburg LLP

(57) ABSTRACT

A vibratory conveying apparatus for conveying material. The apparatus includes a bed on which material is conveyed, a counterbalance supported on a plurality of isolation springs, a plurality of inclined drive springs extending between the bed and the counterbalance, and a plurality of stabilizers for controlling movement of the drive springs along their central axes. A first pair of vibratory motors, each having rotatable eccentric weights, and a second pair of vibratory motors, each having rotatable eccentric weights, are attached to the counterbalance. The eccentric weights rotate in phase with one another to vibrate the bed at a vibration frequency.

19 Claims, 11 Drawing Sheets

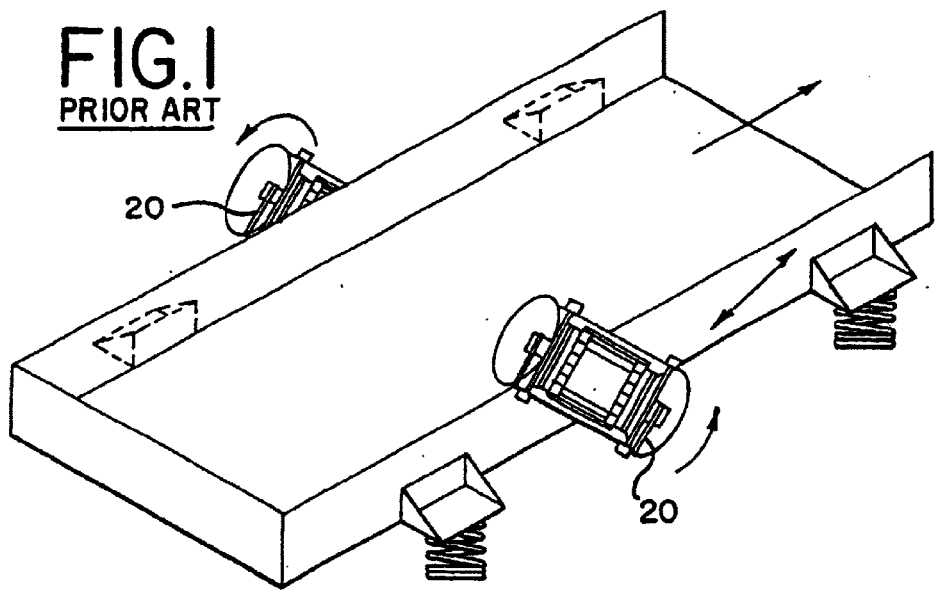
FIG.1 PRIOR ART
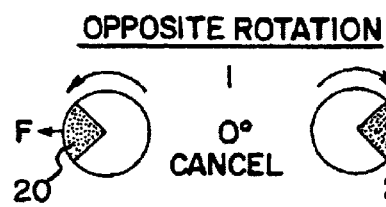
FIG.2A OPPOSITE ROTATION
FIG.2B SAME ROTATION
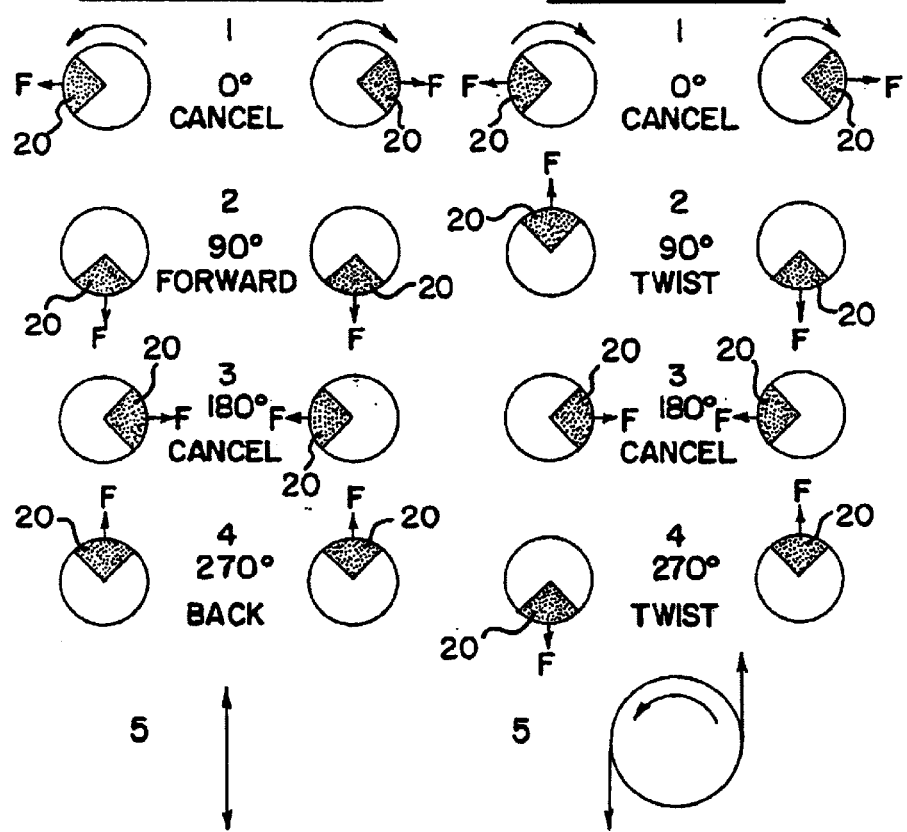

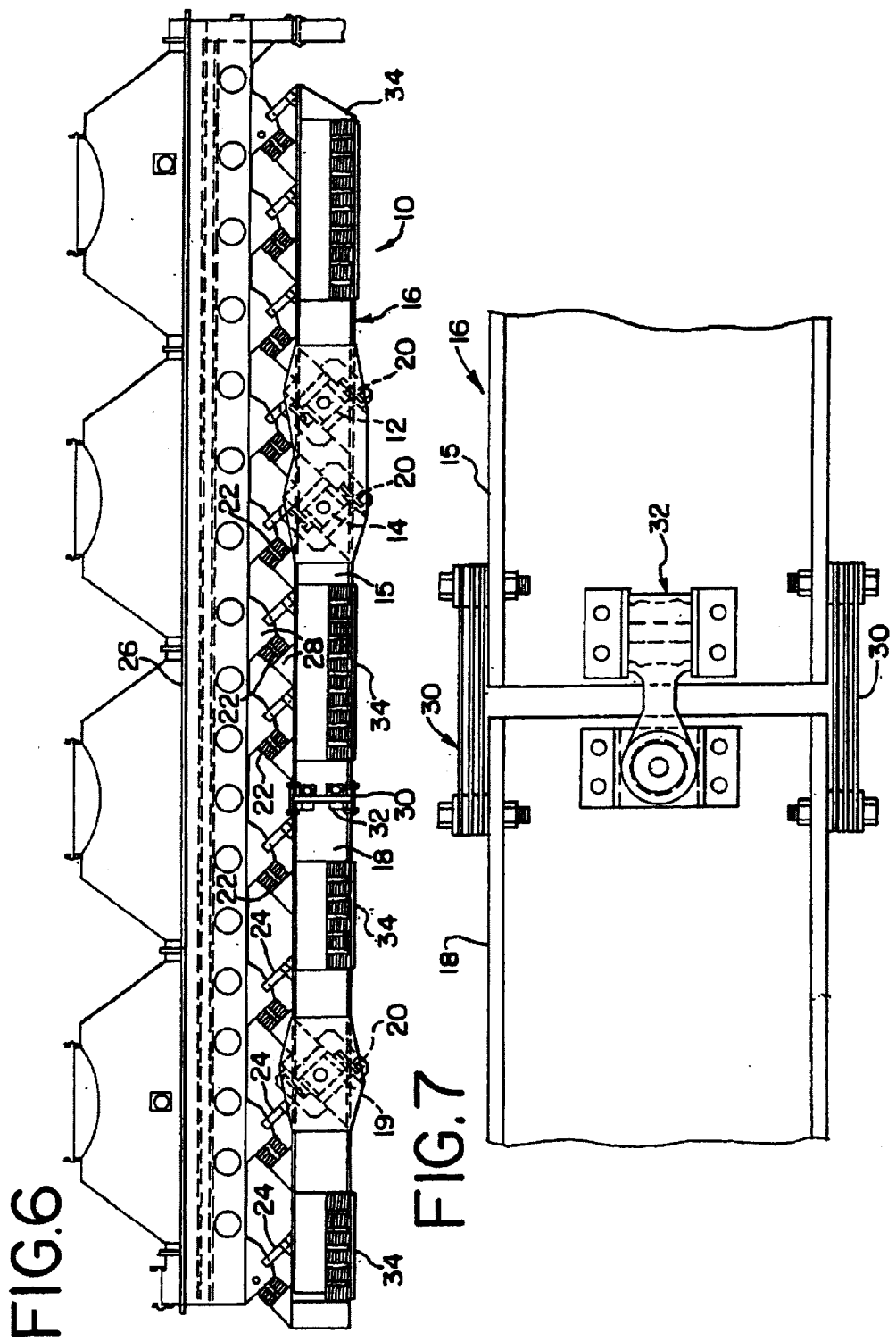

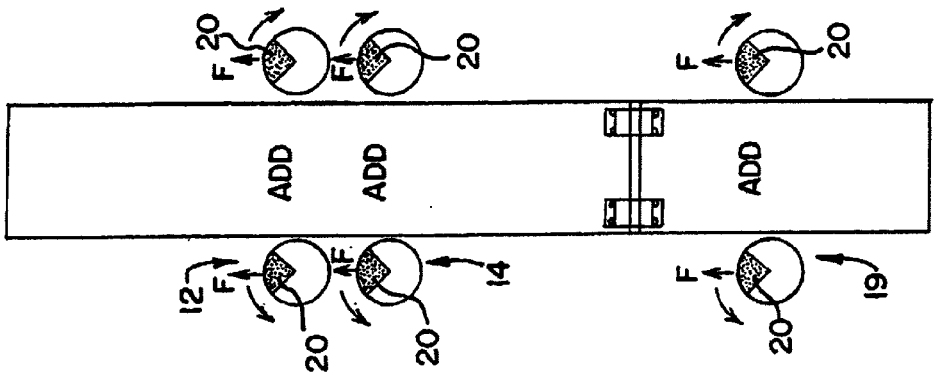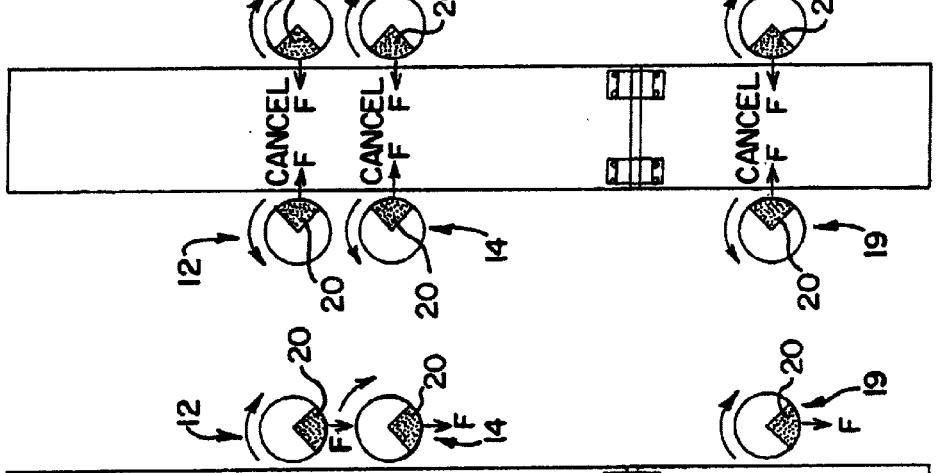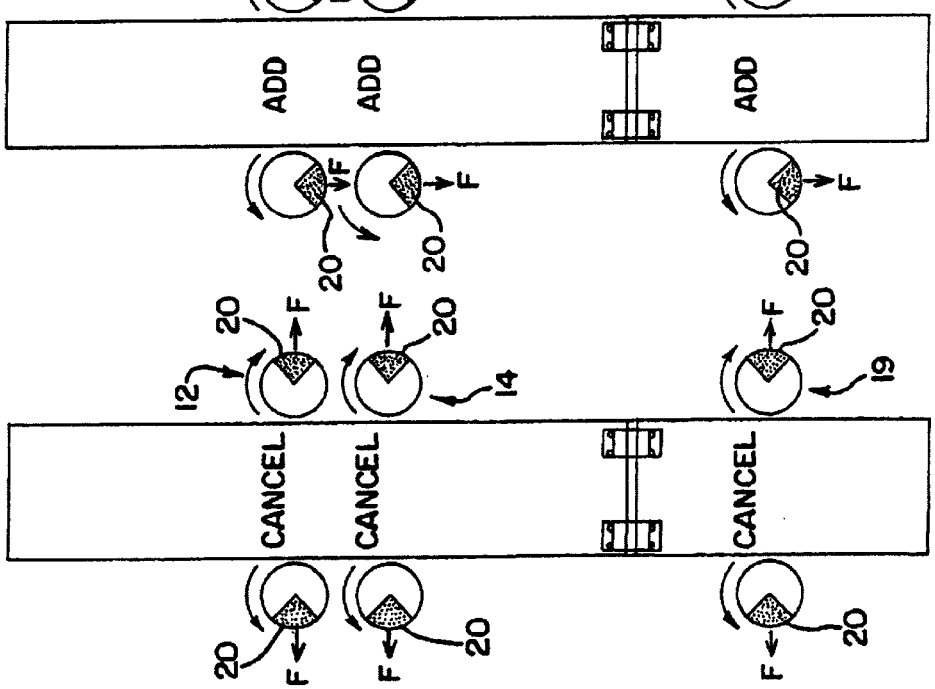

VIBRATORY CONVEYING APPARATUS ADAPTED TO BE DRIVEN BY A PLURALITY OF ACCUMULATIVELY PHASED PAIRS OF ROTATING ECCENTRIC WEIGHTS

RELATED APPLICATIONS

This application claims the benefit of U.S. Provisional Application-No. 60/146,462, filed Jul. 30, 1999.

BACKGROUND OF THE INVENTION

The present invention is directed to a vibratory conveying apparatus that is adapted to be driven by a plurality of pairs of rotatable eccentric weights, wherein the vibratory conveying apparatus includes sub-resonant tuned drive springs and the plurality of pairs of rotatable weights are accumulatively phased during rotation.

In the vibratory industry, vibratory conveying apparatus such as vibrating feeders, vibrating conveyors, vibrating screens, vibrating heat transferring fluidized beds, attrition mills, and the like, were all powered by a well-known and popular driving method called the "Single Input" or "Brute Force" type of drive. A single pair of rotating eccentric weights is the sole source of the input power in this kind of drive. Being installed directly across from one another, a single pair of eccentric weights rotating in opposite directions, as shown in FIG. 1, would vibrate the vibratory conveying apparatus with a linear or "back and forth", straight line motion. As the load carrying capability of the conveying apparatus increased over the years, the weight of the rotating eccentric weights also necessarily increased in size. So did the horsepower demand of the electric motor utilized to rotate the eccentric weights. Examples of this practical situation are seen in U.S. Pat. No. 4,180,458 and U.S. Pat. No. 4,826,017. In both of those patents, only one pair of rotating eccentric weights is utilized. U.S. Pat. No. 4,180,458 utilizes a "vee-belt" type of connection between the jack shaft which is rotating the eccentric weights and the driving motor. In U.S. Pat. No. 4,826,017, vibratory motors could be utilized, or eccentric weights mounted on a jackshaft that are rotated by a vee-belt or chain type of motor drive could be utilized.

To achieve a circular conveying motion, a pair of rotating eccentric weights are mounted diametrically opposite to one another. Then, by rotating the eccentric weights in the same direction, a "twist" type of vibratory action or circular conveying could be achieved. An example is U.S. Pat. No. 3,254,879. As shown therein two electric motors are directly coupled to eccentric weights mounted on a jack shaft. The result is a helical stroke that conveys the contained material in a circular direction. Another example of this situation is illustrated in Dumbaugh U.S. Pat. No. 3,178,068 and in FIGS. 5A and 5B.

For many years, it has been well known that a single pair of rotating eccentric weights can be combined for use with a vibratory conveying apparatus to produce either a "linear" or "twist" kind of stroke action. By mentally "stopping" and picturing the position of the eccentric weights 20 in four 90° increments of one 360° rotation, one complete revolution is diagramed in each of FIGS. 2A and 2B. When both of the eccentric weights 20 rotate in opposite directions relative to one another as diagramed in FIG. 2A, a "linear" type of stroke output is achieved. By making the pair of rotating eccentric weights 20 rotate in the same direction relative to one another, as depicted in FIG. 2B, the stroke output develops a "twist" from the resulting force-couple.

A pair of rotating eccentric weights will properly "phase" to produce either a "linear" or "twist" kind of vibratory force and resulting stroke output because they inherently seek their lowest level of energy output. Said differently, the vibratory motors which rotate the eccentric weights try to do as little work as possible. Consequently, the eccentric weights "balance" or cancel the force output for two-quarter portions of the rotational cycle at 0° and 180°. In so doing, the two eccentric weights are necessarily prompted to combine their force outputs for the remaining two-quarter portions, or the other half, of their rotational cycle at 90° and 270°. When that happens, the two motors involved accumulatively add their power capability. For example, if two 1.5 horsepower (HP) motors are used, the total power capability of the pair of motors would be 3 HP.

The pair of rotatable eccentric weights can be mounted on a jackshaft with two bearings and driven by a motor through an appropriate "vee" belt combination. Two jackshafts, one for each eccentric weight, would be required. Any other type of suitable transmission such as a chain, gears, or the like could also be used. Another alternative is to utilize a vibratory motor 11 as provided by Kinergy Corporation, as shown in FIG. 3. Such a vibratory motor has a double extended shaft. Eccentric weights 20 can be installed on both ends of the shaft, but are cumulatively considered as a single rotatable eccentric weight. Vibratory motors equipped with shaft mounted eccentric weights will be emphasized herein, but other jackshaft driven combinations can also be used such as vee-belts and the like. In either instance, the pair of rotatable eccentric weights are installed on and become an integral part of the conveying trough assembly.

When more input power is needed to move heavier loads along the length of the conveying trough, more rotating eccentric weight force and horsepower are needed. Consequently, the rotatable eccentric weights become larger and heavier and have a greater force output. Likewise, the electrical windings in the vibratory motor increase in size to produce more horsepower. This increase in eccentric weight force output and the respective vibratory motor horsepower has approached the point that the vibratory motors are presently as large as practical to manufacture or to utilize on a vibratory conveying type of apparatus. Therefore, if some method of combining a plurality of pairs of vibratory motors and rotatable eccentric weights could be found, it would enable two or more pairs of vibratory motors and eccentric weights to be used in combination instead of only one pair of motors that are essentially two times as large or more.

Over the years, many attempts have been made to combine more than one pair of vibratory motors and eccentric weights to increase the total force output and the horsepower capability. Unfortunately, when more than one pair of rotating eccentric weights were utilized, they would always tend to "cancel" their respective force outputs. The resulting stroke action on the vibratory machine would actually become less or might even be reduced to virtually no displacement or zero stroke. An example of this unwanted situation is illustrated in FIG. 4. In FIG. 4, a second pair of rotating eccentric weights is being utilized. After the rotating eccentric weights are started up and are turning at their appropriate speed, each of the four eccentric weights will move to a place in its rotation so that all the output forces cancel one another. Consequently, the net force output is essentially zero and the motors involved are developing virtually no horsepower. This also happens when the motors are changed to rotate in opposite directions. Instead of adding their respective force outputs from each pair of eccentric weights, they cancel one another. This is the reason any combination of free-wheeling eccentric weights utilized on a vibratory conveying apparatus has always previously been limited to one pair.

The desired accumulative phasing of a plurality of pairs of rotating eccentric weights has never been successfully achieved with free-wheeling rotating eccentric weights that are not physically or mechanically rotationally linked or coupled to one another. Therefore, for many years, there has been an unanswered need for the ability to use more than one pair of rotating eccentric weights to enable the total vibratory force output capability to be increased and the related total amount of horsepower increased.

SUMMARY OF THE INVENTION

A vibratory conveying apparatus adapted to be driven by a plurality of accumulatively phased pairs of free-wheeling rotatable eccentric weights. The accumulative force output produced by the rotating eccentric weights will be a unified amount equal to the sum of all the multiple pairs of eccentric weights. The respective power outputs of the motors turning these eccentric weights will also accumulatively add. This wanted "phasing" of multiple pairs of rotating eccentric weights will only occur when used in conjunction with properly stabilized, sub-resonant tuned, stiff drive springs. This kind of vibratory drive is sometimes called a "Free Mass" system but is more commonly known as the "Kinergy Drive System". Technically, it is identified as the "Electrically Controlled, Motorized Version of a 'Free Force Input' Combined with Sub-Resonant Tuned Springs" type of vibratory drive as disclosed in Dumbaugh U.S. Pat. No. 3,251, 451.

The accumulative phasing of a plurality of pairs of rotating eccentric weights is applicable to vibratory conveyors of the non-balanced type, which must be rigidly fixed to their support structure. It is also applicable to vibratory conveying machines that are dynamically counterbalanced and provided with isolation springs. The counterbalance can be one single longitudinal assembly, or the counterbalance can be sectionalized in a plurality of sections as shown in Dumbaugh U.S. Pat. No. 4,149,627. The present invention is applicable to all types of induced conveying apparatus and machines, for example, vibrating feeders, vibrating conveyors, vibrating screens, vibrating fluidized bed coolers or dryers, foundry shakeouts, sand reclaimers, attrition mills, and the like. The invention can also be applied to circular conveying machines, as shown in FIGS. 14A–B, such as vibrating feeders, conveyors, spiral elevators, fluidized bed coolers or dryers, attrition mills, and the like. It is important to note all of these vibratory conveying machines must employ the sub-resonant tuned springs kind of vibratory drive configuration that is properly stabilized for this wanted multiple phasing of a plurality of pairs of rotatable eccentric weights to occur.

The multiple pairs of rotatable eccentric weights are installed on and become an integral part of the conveying trough assembly of the conveying apparatus when the vibratory conveying apparatus is the "non-balanced" type. This means its base frame is rigidly "fixed" to a robust stationary foundation. Conversely, when the vibratory conveyor is "dynamically counterbalanced", the pair of rotatable eccentric weights can be installed on either the conveying trough or on a counterbalancing member. When the conveying apparatus is counterbalanced, the pair of rotatable eccentric weights are almost always installed on the counterbalancing member.

BRIEF DESCRIPTION OF THE DRAWING FIGURES

FIG. 1 is a sketch of a vibratory conveyor driven by a single pair of vibratory motors with virtually equally sized rotating eccentric weights on each motor.

FIG. 2A is a diagram illustrating the resulting stroke output from a pair of rotating eccentric weights rotating in opposite directions relative to one another.

FIG. 2B is a diagram illustrating the resulting stroke output from a pair of rotating eccentric weights that are rotating in the same direction relative to one another.

FIG. 6 is a side elevational view of a vibratory conveying apparatus having three pairs of vibratory motors and rotatable eccentric weights and sub-resonant tuned steel coil type drive springs, and stabilizers.

FIG. 7 is a side elevational view of the connection between two sections of a counterbalance.

FIGS. 8A–D are diagrams showing the accumulative phasing of the three pairs of rotating eccentric weights of the conveying apparatus shown in FIG. 6.

Figure 3:
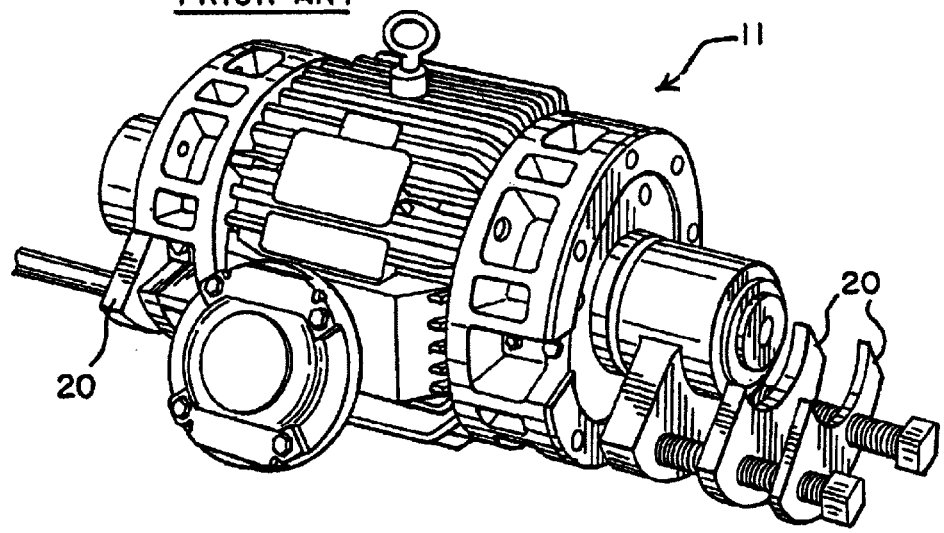
FIG. 3 shows a vibratory motor with rotatable eccentric weights.
Figure 4:
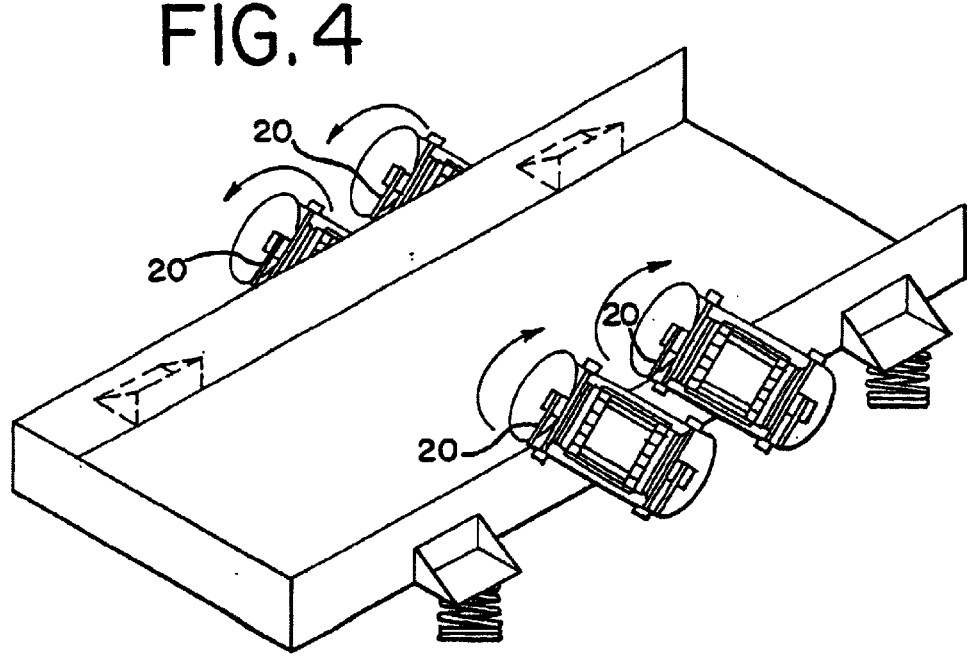
FIG. 4 is a sketch of a vibratory conveyor having two pairs of rotating eccentric weights attached to a conveyor apparatus, but without sub-resonant tuned drive springs.
Figure 5A:
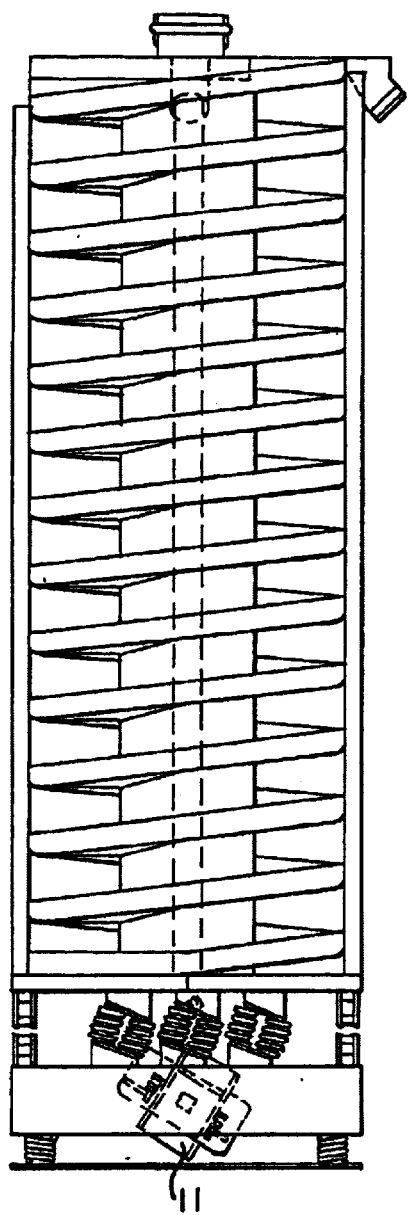
FIGS. 5A and 5B are sketches of a vibratory circular conveying mechanism having a single pair of vibratory motors and rotating eccentric weights.
Figure 5B:
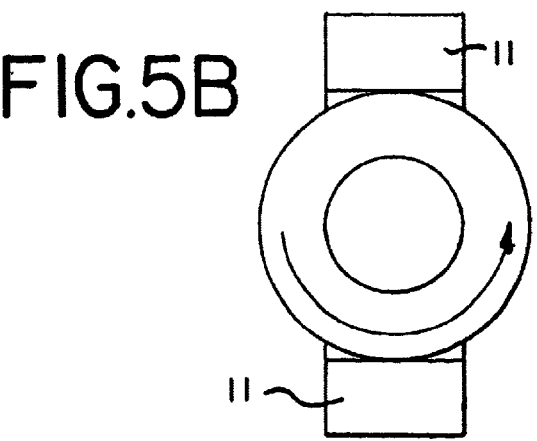
Figure 9A:
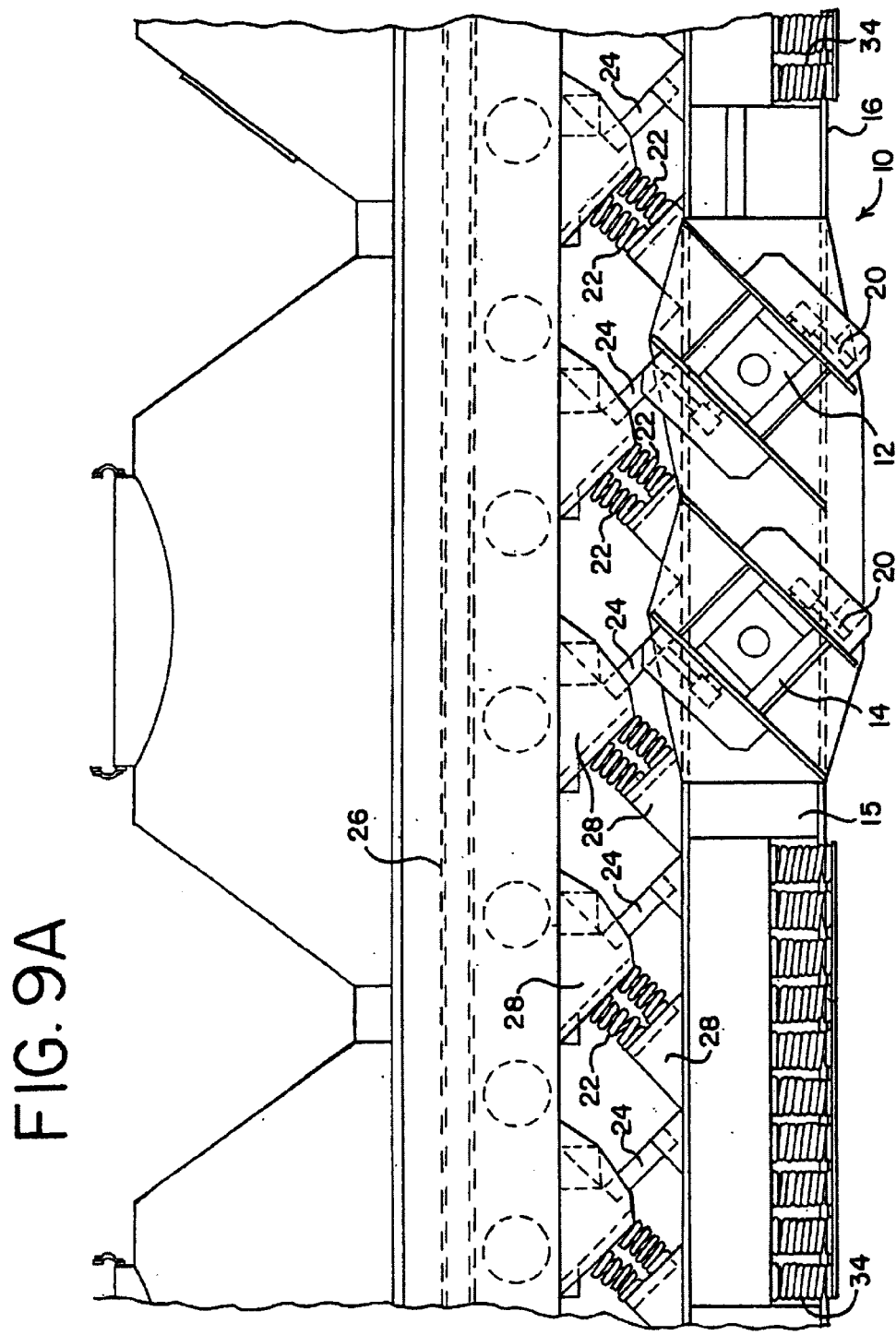

FIG. 9A shows an enlarged portion of the conveying apparatus of FIG. 6.

Figure 9B:
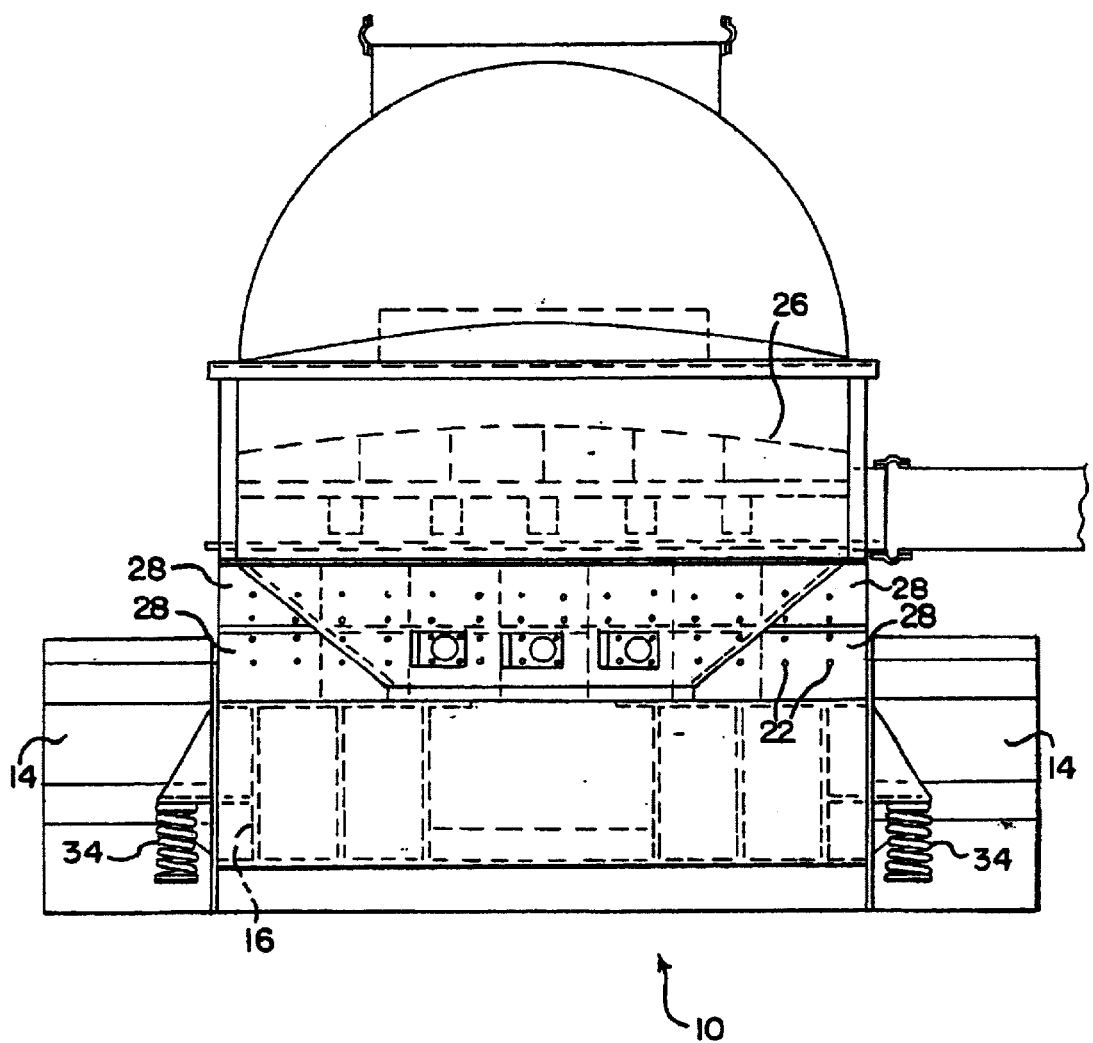

FIG. 9B is a cross section of the conveying apparatus of FIG. 6.

Figure 10:
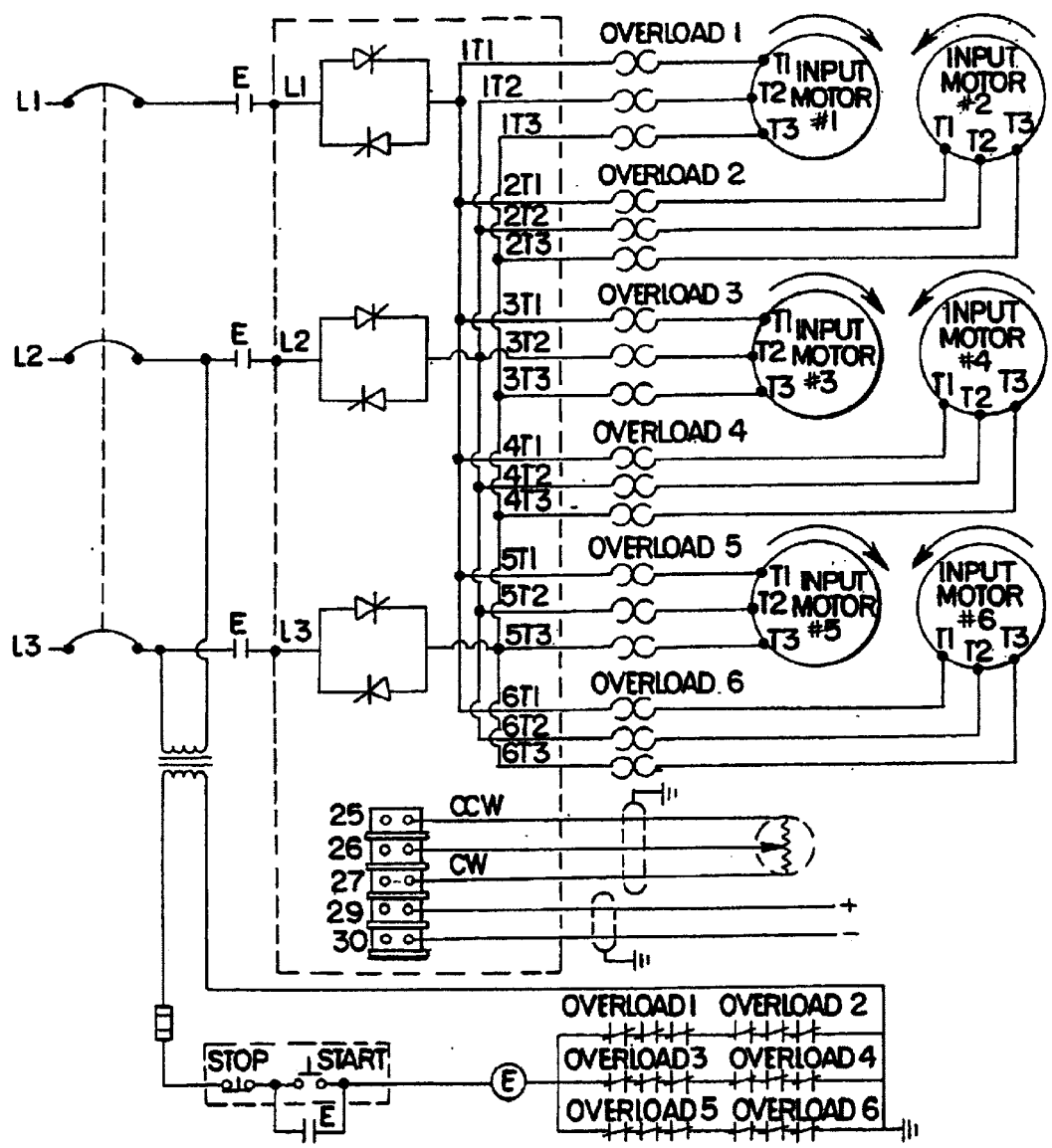

FIG. 10 is an electrical schematic for the vibratory motors of the conveying apparatus of FIG. 6.

Figure 11:
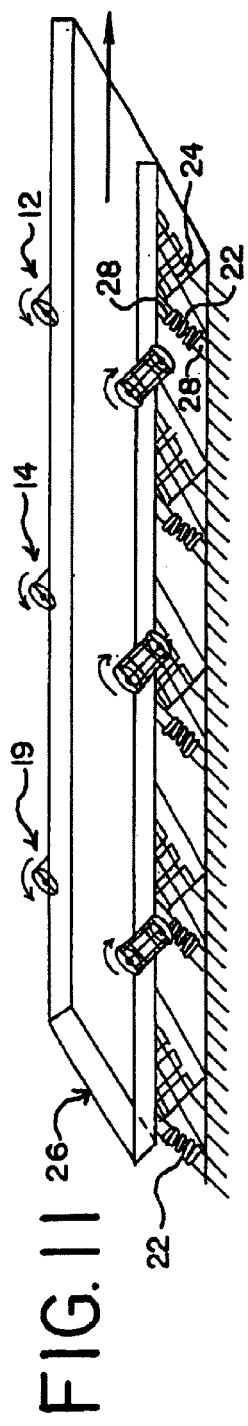

FIG. 11 is a side elevational view of a non-counterbalanced vibratory conveying apparatus including a plurality of pairs of vibratory motors and eccentric weights.

Figure 12:
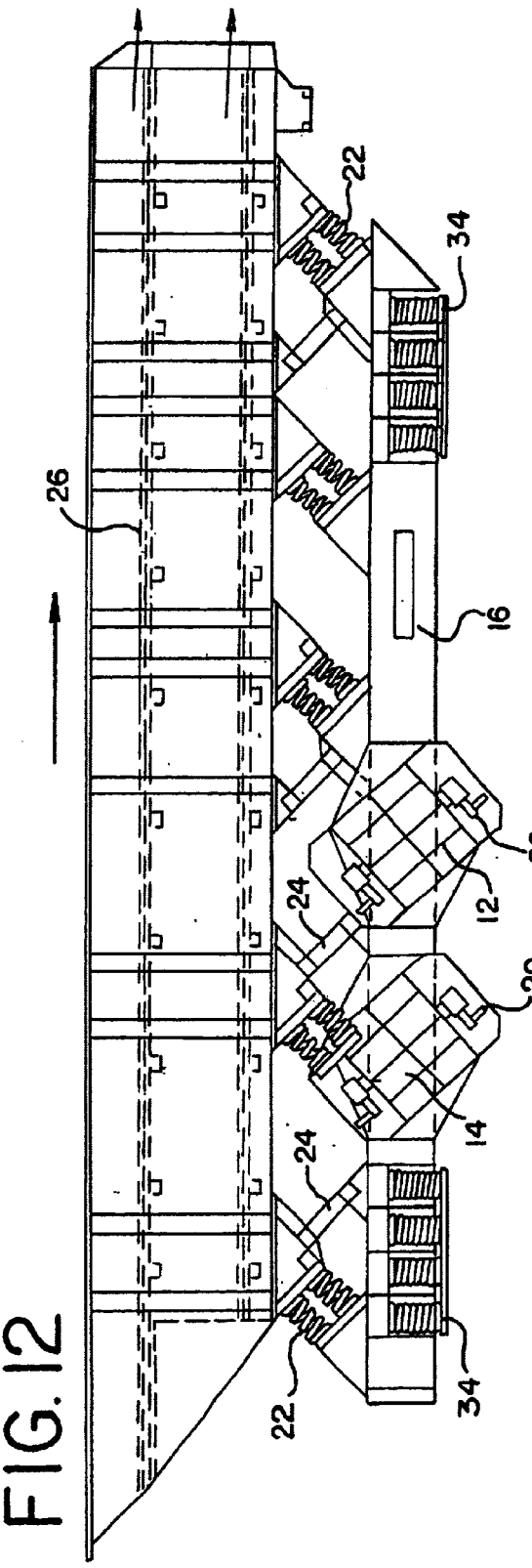

FIG. 12 is a side elevational view of a counterbalanced vibratory conveying apparatus having a one-piece counterbalance and a plurality of pairs of vibratory motors and rotatable eccentric weights.

Figure 13:
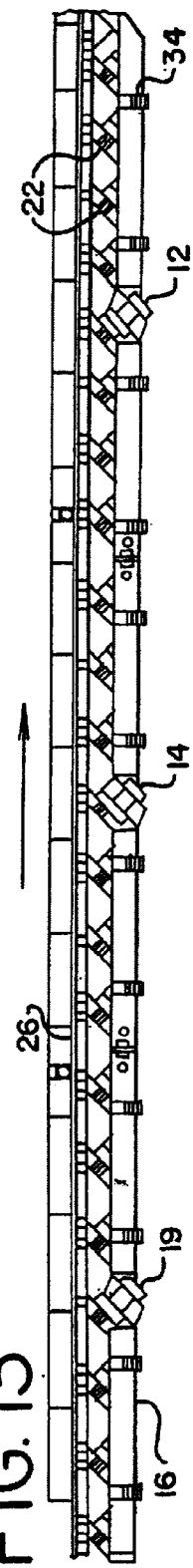

FIG. 13 is a side elevational view of a vibratory conveying apparatus including a sectionalized counterbalance and three pairs of vibratory motors and rotatable eccentric weights.

Figure 14A:
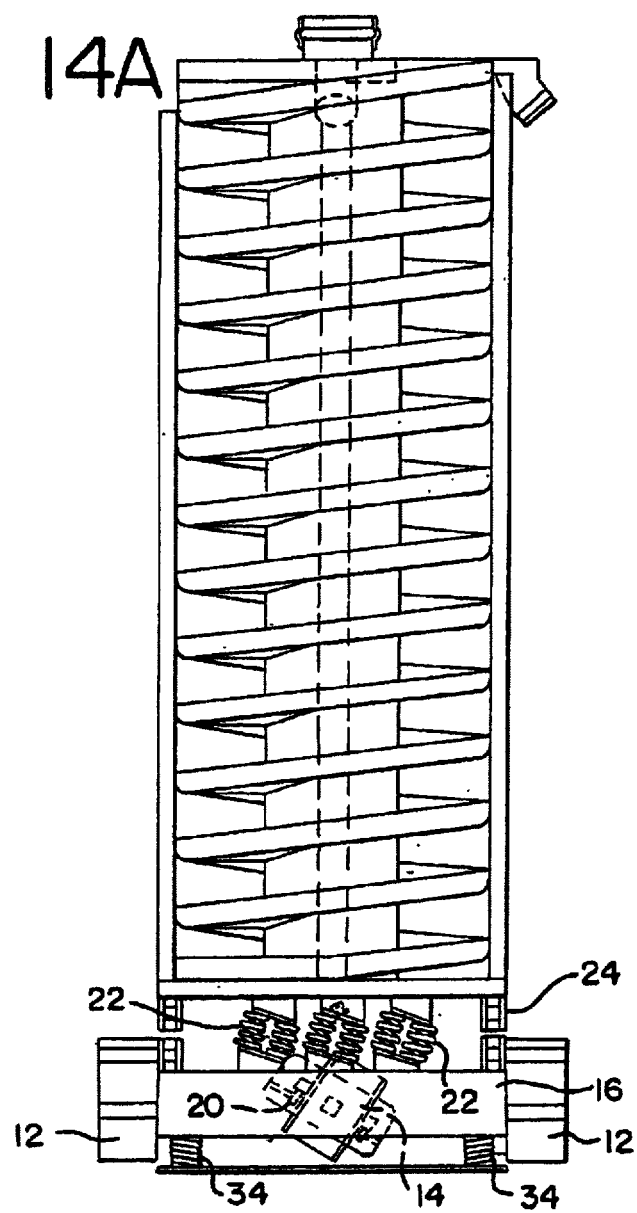
Figure 14B:
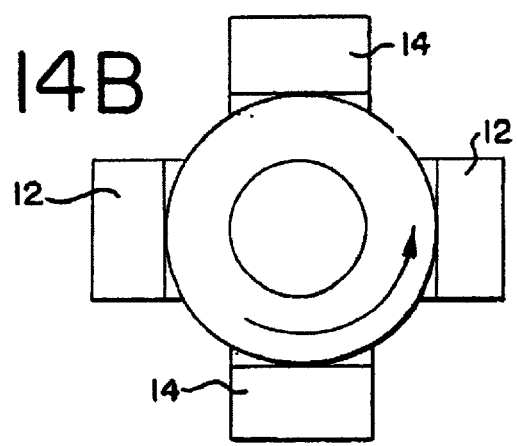

FIGS. 14A and 14B are sketches of a circular vibratory conveying apparatus including a plurality of pairs of vibratory motors and rotating eccentric weights.

FIGS. 15A–D are diagrams that show the accumulative phasing of the eccentric weights of the circular conveyor of FIGS. 14A–B.

Figure 15A:
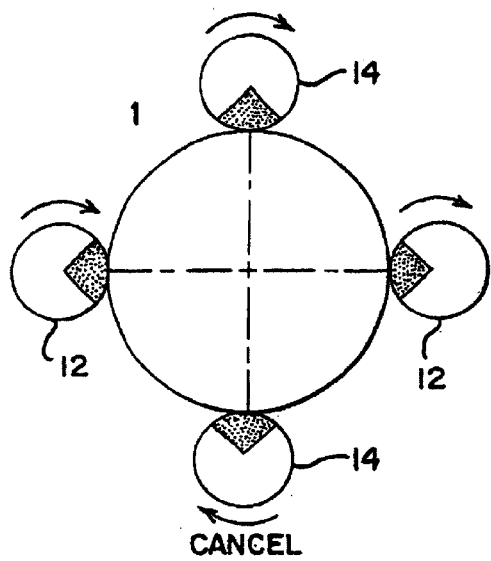
Figure 15B:
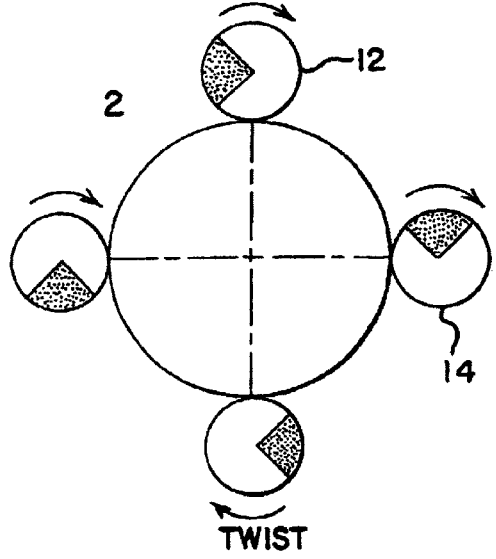
Figure 15C:
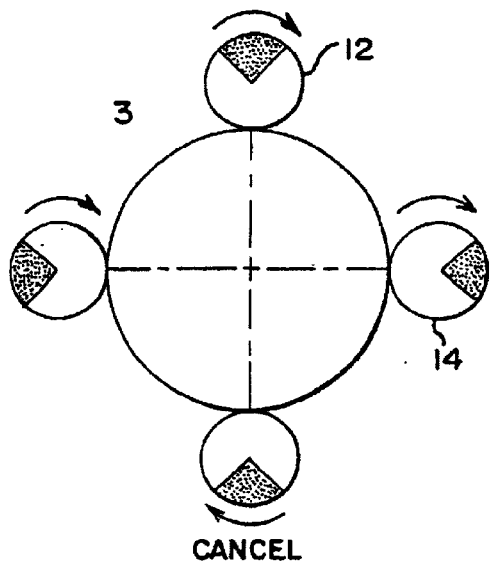
Figure 15D:
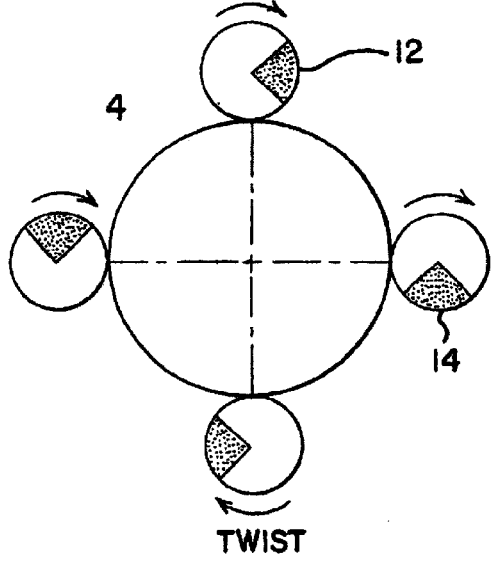
Figure 15E:
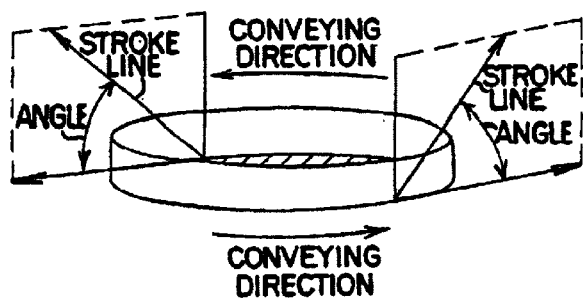

FIG. 15E is a diagram that shows the stroke line of the rotating eccentric weights of FIGS. 15A–D.

DETAILED DESCRIPTION OF THE PREFERRED EMBODIMENTS

A vibratory conveying apparatus 10 of the present invention, such as a sand cooler, is shown in FIG. 6. The vibratory conveying apparatus 10 utilizes the electrically controlled drive method as disclosed in Dumbaugh U.S. Pat. No. 3,251,457, which is incorporated herein by reference, and a sectionalized or split-counterbalance 16 as outlined in Dumbaugh U.S. Pat. No. 4,149,627, which is also incorporated herein by reference. The vibratory conveying apparatus 10 includes a first pair of vibratory motors 12 and a second pair of vibratory motors 14 placed relatively close together on the front section 15 of the counterbalance 16. The rear or back section 18 of the counterbalance 16 has a third pair of vibratory motors 19. In other words, a total of six vibratory motors are utilized as shown in FIG. 6. The two motors in each pair of motors are located transversely across from one another with respect to the longitudinal length of the conveying apparatus 10. Each vibratory motor includes a rotatable eccentric weight 20. Since the rotating eccentric weights 20 are located on the top and bottom of each motor, a total of twelve individual eccentric weights would be involved, but all of the eccentric weights on a single motor are considered herein to be a single eccentric weight. The eccentric weight 20 attached to one of the vibratory motors 11 in a pair of vibratory motors is substantially equal in size to the eccentric weight attached to the other vibratory motor 11 in the pair of vibratory motors. Each motor is rated 5 HP, which would make a total of 30 HP provided by the six vibratory motors, although other sizes of motors can be used. If desired, only two pairs or more than three pairs of vibratory motors and eccentric weights can be used. While electric motors are preferred, air motors or hydraulic motors can also be used.

Each vibratory motor 11 in a pair of vibratory motors preferably has the substantially same size eccentric weight 20 attached thereto, such that each vibratory motor and eccentric weight in the pair of vibratory motors and eccentric weights produce substantially the same force output during operation. However, the total force output of a first pair of vibratory motors and eccentric weights does not necessarily have to equal the total force output of a second pair of vibratory motors and eccentric weights.

All six motors synchronize and provide an accumulatively phased force output equal to the sum of the individual force outputs of all three pairs of eccentric weights 20. The proper phasing of the pairs of eccentric weights 20 happens if each pair of motors 12, 14 or 19 is started separately, or in any combination, or all started at the same time. The two motors 11 in each pair of motors 12, 14 and 19 rotate in the opposite direction relative to one another, which is preferred for a unidirectional conveying apparatus. However, these motors would still try to "phase" even if the rotation was different when these six motors are working in conjunction with sub-resonant tuned steel coil drive springs that have flat bar type stabilizers to guide their stroke line.

The conveying apparatus 10 includes a top bed such as a trough assembly 26 for conveying the conveyed material, which may, for example, be a fluidized bed for passing air up through the conveyed material, such as foundry sand. Underneath the top trough assembly 26 are a plurality of brackets 28 containing steel helical coil type drive springs 22 as shown in FIG. 6. These are very stiff springs that are singularly bolted at the top and bottom end to the mounting brackets 28. The sectionalized, longitudinal type counterbalance 16 is positioned under the sets of sub-resonant tuned drive springs 22. The split or separation in the counterbalance 16 is bolted together, as shown in FIG. 7, by flat bar type straps 30 at the top and bottom flanges of each beam that makes up the counterbalance. On the vertical webs of the counterbalance, two rubber bushed steel shank connecting arm links 32 are utilized as shown in FIG. 7. This connection is relatively strong in tension and compression in the horizontal plane. Vertically, it is relatively resilient or not very strong. Supporting the entire vibratory conveying apparatus 10 are steel coil type isolation springs 34 mounted vertically in compression. Two pairs of vibratory motors 12 and 14 are mounted close together on the front or the longer section 15 of the counterbalance 16. The motors in the third pair of motors 19 are mounted directly across from one another on the rear or the shorter portion 18 of the counterbalance 16. The goal is to make the load carrying trough 26 to vibrate at a prescribed stroke of, for example, one-half inch at a frequency of 570 cycles per minute (CPM), which is the same as the rotational speed of the motors at 570 revolutions per minute (RPM). In other words, the operating frequency of the conveying apparatus 10 in CPM is the same as the RPM of the motors.

The motors can be energized in separate steps of individual pairs. Preferably, the first pair of motors 12 at the front, and then the second pair of motors 14 in the middle, and then the third pair of motors 19 installed at the rear. The other option is to energize all six motors at the same time.

After being energized, the motors accelerate the rotatable eccentric weights 20 installed on the top and bottom shaft extension of the motors. While the weights are accelerating, a slight "shimmy" or shudder-like movement may be present in the apparatus 10 in its entirety. After all six motors have reached full speed, the stroke on the conveying trough assembly 26 begins to grow steadily from, for example, from one-eighth inch to the desired maximum of one-half inch in about twenty seconds. Thus, the three pairs of motor combinations require about ten to twenty seconds after being energized to accelerate the eccentric weights 20 and to properly "phase" or to accumulatively synchronize the outputs of the eccentric weights 20.

All of the rotating eccentric weights 20 may have exactly the same force output. If any pair of these motors is de-energized, then the resulting stroke on the trough 26 will decrease by one-third from its maximum amount. If two pairs of motors are de-energized, and only one pair remains energized, then the stroke on the conveying trough 26 will be reduced to one-third its maximum amount.

The "phased" or synchronized eccentric weights 20 on the vibratory motors excite or prompt the steel coil drive springs 22 to move back and forth, or compress and extend, in a straight line of stroke. That "line" is guided by the flat bar type stabilizers 24 installed 90° or perpendicular to the axial centerline of the steel coil drive springs 22. The conveying trough 26 positioned on top of the drive spring brackets 28 vibrates back and forth in reaction to the movement of the counterbalance 16 below. This is in keeping with Newton's Law of an "equal and opposite reaction". Stabilization of the drive springs 22 must be relatively rigid in a direction transverse to the line of stroke and relatively weak in the direction of stroke. For example, the flat bar stabilizer 24 may be five inches wide across its transverse width and only one-eighth inch thick in the direction of the stroke. If the drive springs 22 are not rigidly stabilized in a direction transverse to the line of stroke, then the rotating eccentric weights may not synchronize. The stabilizers 24 may be formed in other configurations than as flat bars so long as the stabilizer is relatively rigid in a direction transverse to the line of stroke and relatively weak in the direction of stroke. The vibratory motors are tilted or inclined from horizontal to agree with the stroke line and the installed inclined angle of the drive springs 22.

The entire apparatus 10 vibrates very smoothly and quietly when all six motors are up to their full speed. The amount of vibratory stroke remains constant or steady. A given amount of bulk solid, such as foundry sand, in the conveying trough 26 installed above the counterbalance 16 can be conveyed forward at a steady speed of, for example, approximately forty feet per minute (FPM).

The stiff steel coil drive springs 22 have a combined natural frequency that is always above the maximum speed of the motors being utilized. "Sub" means "under" and "resonant" means "natural frequency". Therefore, "suresonant" means to maintain the top running speed of the motor (for example, 600 RPM or CPM) to always be under the "natural frequency" of all the steel coil drive springs 22 (for example, 650 CPM) when the vibratory conveyor 10 is in the "no load" state or empty condition. When a load is applied to the conveying trough 26, the "natural frequency" of all the installed drive springs 22 will inherently reduce in response to the added weight of the load (for example, to 625 CPM). Because the natural frequency of the drive springs 22 has decreased (from 650 to 625 CPM), and moved closer to the motor speed (600 RPM or CPM), the entire drive configuration works harder. The more the natural frequency of the drive springs 22 decreases because of additional load being added to the conveying trough 26, the more close the natural frequency of all the drive springs 22 comes to the running speed of the motors. Thus, the drive configuration works even harder. This is the advantage of "sub-resonant" tuning.

Consequently, the stiff steel coil drive springs 22 in combination with the six motors inherently drive harder when load is applied to the conveying trough 26. Therefore, the use of "sub-resonant" tuning takes advantage of the principal of "natural frequency". However, it should be noted this kind of drive configuration does not normally operate in "natural frequency".

When the conveying apparatus is of relatively light-weight construction, the steel coil type of drive springs could be omitted and only the stabilizers can be used as drive springs to achieve the desired sub-resonant tuning. An example is a very light-weight food handling conveyor of a sanitary design.

"Phasing" of the eccentric weights 20 is more efficiently and effectively accomplished when the first pair of motors 12 nearest to the discharge end of the induced conveying apparatus 10 have a higher eccentric force output than do the remaining motors. For example, if a total of 35,000 pounds (lbs) of force were required in this example, the most downstream paired group of eccentric weights 20 should have a combined output of, for example, 20,000 pounds. Then the rotating eccentric weights spaced along the upstream length of the conveying trough or the remaining upstream portion of the counter-balance would have a total force output of 15,000 pounds.

Further, the stiff drive springs 22 should be arranged so the half-length of the trough 26 nearest to the discharge end of the vibratory apparatus 10 would have a higher percentage of the required number of drive springs 22 installed. The remaining or upstream half of the trough length will have less than half the total required number of drive springs 22 installed. When the counter-balance is "sectionalized", then the orientation and installation of the required number of drive springs 22 will have the same relationship on each section of the counterbalance. Namely, more than half of the total needed drive springs 22 are installed on the downstream half of the section's length. Said differently, more drive springs 22 are installed on the half-length of an individual counterbalance section that is nearest to the discharge end of the vibratory apparatus 10. The other half of the counter-balance section that is upstream would have less than half of the required number of drive springs 22 installed. In other words, the half-length of the counterbalance section that was nearest to the inlet or more distant from the discharge end would have a lesser number of drive springs 22 installed. However, the flat bar type stabilizers 24 remain evenly distributed across the width and along the length of the vibratory apparatus 10.

The objective is to make the respective force outputs of the eccentric weights 20 to "pull" the trough 26 of the conveying apparatus 10 in tension from the discharge end as compared to "pushing" the inertial mass in compression from the inlet end. The same relationship is wanted from the total number of drive springs 22 installed that help to make the apparatus 10 vibrate. This is the reason the collective forces from both the rotating eccentric weights 20 and the drive springs 22 should place the overall length of the vibratory apparatus 10 in tension as compared to being in compression. More simply stated, the vibratory apparatus is dynamically being "pulled" instead of being "pushed".

Until now, the single pair of vibratory motors was placed in the mid-section of the length of the conveying apparatus, and the steel coil drive springs 22 were equally distributed along the length of the vibratory apparatus. No intentional effort was made to place more force output on the downstream half when compared to the upstream half of the length of the vibratory apparatus.

The rotation of the two motors in each pair of motors 12, 14 and 19 are preferred to be opposite to one another, but with all the motors on each side of the apparatus 10 otherwise all rotating in the same direction. The vibratory apparatus 10 will still have proper "phasing" when all the vibratory motors are not turning opposite to one another and with the same direction. However, indications are the performance of the vibratory apparatus 10 will most likely be less than the achievable results when all the pairs of eccentric weights are turning opposite to one another as shown in FIGS. 8A–D.

Electrically, each set of paired motors 12, 14 and 19 can be started separately until all are energized. Preferably, from the front to the back. The other option is to start all the paired motors at the same time, but this causes the electrical power supply to be subjected to the maximum it amount of in-rush current by totaling all the combined motors.

When an electrical means for adjusting the operating stroke and frequency of the vibratory machine is wanted, such as shown in FIG. 10, it is preferred to be large enough to control the total combination of paired motors installed on the vibratory apparatus 10. If each of the paired motors is to be controlled individually for some reason, then the appropriate steps must be taken to ensure each of those individual controllers are responding to the same electrical pilot signal (usually 4 to 20 ma d.c.) to ensure each of the motors is rotating at the same speed throughout the range of adjustment. This maybe accomplished by use of a common electrical potentiometer on either the variable voltage or the frequency inverter type of electrical controls. This applies to both the unidirectional and the circular conveying kind of induced conveying vibratory machines.

The respective overload protection for each of the paired motors can shut down that given pair when electrical difficulty is experienced. This overload protection does not have to shut down all the other paired motors when an electrical overload is experienced with a given pair of motors. This also permits the vibratory apparatus 10 to remain in operation even though its tons per hour (TPH) capacity will probably be at a reduced amount. This permits production to be maintained and the vibratory machine can be scheduled for a more timely "shutdown" to repair the electrical problem.

A non-counterbalanced vibratory conveying apparatus is shown in FIG. 11 including a plurality of pairs of vibratory motors 12, 14 and 19 each having rotatable eccentric weights attached to the trough 26. A plurality of inclined drive springs 22 and stabilizers 24 support the trough 26 on a stationary base.

A counterbalanced vibratory conveying apparatus is shown in FIG. 12 having a one-piece counterbalance 16 and a plurality of pairs of vibratory motors 12 and 14 each having rotatable eccentric weights.

A vibratory conveying apparatus is shown in FIG. 13 that includes a three-piece sectionalized counterbalance 16 and three pairs of vibratory motors 12, 14 and 19 each including rotatable eccentric weights, wherein each pair of vibratory motors is attached to a respective section of the counterbalance.

A circular vibratory conveying apparatus is shown as a spiral elevator in FIGS. 14A and 14B which includes a plurality of pairs of vibratory motors 12 and 14 each having rotatable eccentric weights 20. The accumulative phasing of the eccentric weights of the circular conveyor of FIGS. 14A–B is shown in FIGS. 15A–D. If desired, only three individual or equal groups of vibratory motors may be used that are spaced approximately one hundred twenty degrees apart.

A plurality of paired vibratory motors with respective rotating eccentric weights can be appropriately spaced along the length or around the diameter of a vibratory apparatus and both their total dynamic force output and the horsepower capability will be accumulatively available to help drive the apparatus. The unidirectional or circular induced conveying apparatus can be non-balanced and fixed to the earth, or dynamically counterbalanced with isolator springs 34 to support it.

In addition to reducing cost, the present invention provides many benefits. The vibratory motors can be utilized on sectionalized, longitudinally counterbalanced conveying apparatus. This permits the building of longer length conveying apparatus with more TPH capacity. The number of component parts is minimized which aids in manufacturing. Finally, the simultaneous adjustment of the operating stroke and frequency by means of a variable voltage electrical control as outlined in U.S. Pat. Nos. 3,251,457 and 4,015,705 can be successfully utilized. As a substitute for the variable voltage control, a frequency inverter can also be utilized.

Since these motors are combined with sub-resonant tuned drive springs 22 that are properly stabilized by stabilizers 24, the combination of a plurality of pairs of motors requires less work output per pair of motors to align with the movement of the stiff drive springs 22 than it would be to try to be "out of step" or not phased or accumulatively synchronized with all the sub-resonant tuned drive springs 22.

The paired dynamic force outputs of the free-wheeling non-mechanically linked eccentric weights 20 can be spread out or distributed along the length of the conveying apparatus. This reduces the structural stresses when the apparatus is vibrating. The reason is a number of smaller dynamic forces are utilized instead of one much larger force. Further, those smaller forces are spread out and not concentrated at a single location. The same happens with circular conveying apparatus. The forces are distributed around the circumference of the apparatus.

When using vibratory motors in the present invention, a number of smaller motors can be utilized instead of two motors of a much larger size. The smaller motors are easier to handle and readily available. This also avoids the development costs of much bigger motors of the same total power capability. The dimensional requirements of the eccentric weights and the respective motor, vee-belts, chains, bearings, and the like, are minimized. Otherwise, all those components would have to be much larger. The motors can be started in paired increments or steps. This minimizes the "inrush current" demand on the electrical power supply. The "inrush current" would be much higher at the starting of two big motors of the same capability.

Since the conveying capacity of any vibratory apparatus is directly related to how much power is available, the present invention enables much higher tons per hour (TPH) of material to be conveyed or transported. The ability to design and build wide and long vibratory apparatus has been well known for many years. However, being able to provide the needed amount of input power has been an engineering challenge. With this invention, that problem is solved. The required amount of motor horse power can now be provided with a plurality of paired motors each having respective rotatable eccentric weights that accumulatively phase or "add up" to equal the total amount of horsepower needed.

While the drive springs are shown as being inclined, the drive springs could be positioned horizontal or vertical and the same accumulating benefits would be realized.

Various other features of the invention have been particularly shown and described in connection with the illustrated embodiments of the invention, however, it must be understood that these particular arrangements merely illustrate, and that the invention is to be given its fullest interpretation within the terms of the appended claims.

What is claimed is:

1. A vibratory conveying apparatus adapted to vibrate and to convey material, said vibratory conveyor apparatus including:

a bed on which the material is conveyed in a direction;

a plurality of drive springs, each said drive spring having a first end, a second end and a central axis, said first end of each said drive spring being attached to said bed, each said drive spring adapted to compress and extend along a line of stroke generally parallel to said central axis of said drive spring;

a plurality of inclined stabilizers, each said stabilizer having a first end, a second end and a longitudinal axis, said first end of each said stabilizer being attached to said bed, said longitudinal axis of each said stabilizer being generally perpendicular to said central axis of a drive spring, each said stabilizer being more rigid in a direction transverse to said line of stroke than said stabilizer is rigid in the direction of said line of stroke, said stabilizers allowing movement of each said drive spring generally parallel to said central axis of said drive spring and inhibiting movement of each said drive spring generally transversely to said central axis of said drive spring;

a first pair of rotatable eccentric weights coupled to said bed, said first pair of rotatable eccentric weights including a first rotatable eccentric weight adapted to rotate about a first axis and a second rotatable eccentric weight adapted to rotate about a second axis, said first and second axes being located substantially in a first plane and generally parallel to one another; and a second pair of rotatable eccentric weights coupled to said bed, said second pair of rotatable eccentric weights including a third rotatable eccentric weight adapted to rotate about a third axis and a fourth rotatable eccentric weight adapted to rotate about & fourth axis, said third and fourth axes being located substantially in a second plane, said first and second axes being spaced along the direction the material is conveyed from said third and fourth axes, said second plane being non-coplanar with said first plane, said rotatable eccentric weights being free-wheeling with respect to one another and adapted to rotate at substantially the same operating speed with respect to one another, each said rotatable eccentric weight adapted to provide an output force generally perpendicular to its axis of rotation, said rotatable eccentric weights adapted to accumulatively synchronize with one another such that the combined resulting output force of said first pair of rotatable eccentric weights is generally parallel to said line of stroke and the combined resulting output force of said second pair of rotatable eccentric weights is generally parallel to said line of stroke;

whereby rotation of said first pair of rotatable eccentric weights and rotation of said second pair of rotatable eccentric weights, in combination with said stabilizers, accumulatively synchronize such that the output forces of said rotatable eccentric weights and their respective power outputs accumulatively add to cause said bed to vibrate along said central axis of said drive springs.

2. The vibratory conveying apparatus of claim 1 including a first pair of vibratory motors, said first pair of rotatable eccentric weights being respectively attached to said first pair of vibratory motors, and a second pair of vibratory motors, said second pair of eccentric weights being respectively attached to said second pair of vibratory motors.

3. The vibratory conveying apparatus of claim 2 wherein said drive springs have a natural frequency of vibration and said vibratory drive motors are adapted to rotate said eccentric weights at substantially the same operating speed, said natural frequency of said drive springs being greater than said operating speed of said vibratory motors.

4. The vibratory conveying apparatus of claim 1 wherein said first pair of rotatable eccentric weights and said second pair of rotatable eccentric weights are rotatably attached to said bed.

5. The vibratory conveying apparatus of claim 1 including a counterbalance, said second ends of said drive springs and said second ends of said stabilizers being attached to said counterbalance.

6. The vibratory conveying apparatus of claim 5 including a plurality of isolation springs attached to said counterbalance, said isolation springs adapted to support said counterbalance on a support structure.

7. The vibratory conveying apparatus of claim 5, wherein said first pair of rotatable eccentric weights and said second pair of rotatable eccentric weights are rotatably attached to said counterbalance and are thereby coupled to said bed.

8. The vibratory conveying apparatus of claim 7 including a first pair of vibratory motors attached to said counterbalance, said first pair of rotatable eccentric weights being respectively attached to said first pair of vibratory motors, and a second pair of vibratory motors attached to said counterbalance, said second pair of rotatable eccentric weights being respectively attached to said second pair of vibratory motors.

9. The vibratory conveying apparatus of claim 7 wherein said bed includes an inlet end half and an outlet end half, and a majority of said drive springs are attached to said outlet end half of said bed.

10. The vibratory conveying apparatus of claim 7 wherein said counterbalance includes a plurality of sections.

11. A vibratory conveying apparatus adapted to vibrate and to convey material, said vibratory conveying apparatus including:

a bed on which the material is conveyed in a direction;

a counterbalance;

a plurality of isolation springs attached to said counterbalance, said isolation springs adapted to support said counterbalance;

a plurality of drive springs, each said drive spring having a first end attached to said bed, a second end attached to said counterbalance, and a central axis, each said drive spring adapted to compress and extend along a line of stroke generally parallel to said central axis of said drive spring;

a plurality of stabilizers, each said stabilizer having a first end attached to said bed, a second end attached to said counterbalance and a longitudinal axis, said longitudinal axes of said stabilizers being generally parallel to one another, each said stabilizer being more rigid in a direction transverse to said line of stroke than said stabilizer is rigid in said direction of said line of stroke, said stabilizers allowing movement of each said drive spring generally parallel to said central axis of said drive spring and inhibiting movement of each said drive spring generally transversely to said central axis of said drive spring;

a first pair of rotatable eccentric weights rotatably attached to said counterbalance, said first pair of rotatable eccentric weights including a first rotatable eccentric weight adapted to rotate about a first axis and a second rotatable eccentric weight adapted to rotate about a second axis, said first and second axes being located substantially in a first plane and generally parallel to one another; and a second pair of rotatable eccentric weights rotatably attached to said counterbalance, said second pair of rotatable eccentric weights including a third rotatable eccentric weight adapted to rotate about a third axis and a fourth rotatable eccentric weight adapted to rotate about a fourth axis, said third and fourth axes being located substantially in a second plane, said first and second axes being spaced along the direction the material is conveyed from said third and fourth axes, said second plane being non-coplanar with said first plane, said rotatable eccentric weights being free-wheeling with respect to one another and adapted to rotate at substantially the same operating speed with respect to one another, each said rotatable eccentric weight adapted to provide an output force generally perpendicular to its axis of rotation, said rotatable eccentric weights adapted to accumulatively synchronize with one another such that the combined resulting output force of said first pair of rotatable eccentric weights is generally parallel to said line of stroke and the combined resulting output force of said second pair of rotatable eccentric weights is generally parallel to said line of stroke;

whereby rotation of said first pair of rotatable weights and rotation of said second pair of rotatable weights, in combination with said stabilizers, accumulatively synchronize such that the output forces of said rotatable eccentric weights and their respective power outputs accumulatively add to cause said bed to vibrate along said central axes of said drive springs.

12. The vibratory conveying apparatus of claim 11 including a first pair of vibratory motors attached to said counterbalance, said first pair of vibratory motors respectively rotatably attaching said first pair of rotatable eccentric weights to said counterbalance, and a second pair of vibratory motors attached to said counterbalance, said second pair of vibratory motors respectively rotatably attaching said second pair of rotatable eccentric weights to said counterbalance.

13. A method of vibrating a conveying apparatus to convey material, said method including the steps of:

providing a bed having an inlet end and an outlet end on which material is adapted to be conveyed in a direction;

providing a plurality of drive springs, each drive spring having a first end attached to said bed and a second end attached to a support, each said drive spring adapted to compress and extend along a line of stroke;

providing a plurality of stabilizers attached to said bed, each said stabilizer being more rigid in a direction transverse to said line of stroke than said stabilizer is rigid in the direction of said line of stroke;

providing a first vibratory motor having a first rotatable eccentric weight adapted to state about a first axis, a second vibratory motor having a second rotatable eccentric weight adapted to rotate about a second axis, a third vibratory motor having a third rotatable eccentric weight adapted to rotate about a third axis, and a fourth vibratory motor having a fourth eccentric weight adapted to rotate about a fourth axis, said first and second axis being located substantially in a first plane and said third and fourth axes being located substantially in a second plane, said second plane being non-coplanar with said first plane said first and second axes being spaced from said third and fourth axes along the direction the material is conveyed, said eccentric weights being free-wheeling with respect to one another, each said vibratory motor adapted to operate at substantially the same operating speed and to provide an output force generally perpendicular to its axis of rotation, said rotatable eccentric weights adapted to accumulatively synchronize with one another without being rotationally coupled to one another such that the combined resulting output force of said first pair of rotatable eccentric weights is generally parallel to said line of stroke and the combined resulting output force of said second pair of rotatable eccentric weights is generally parallel to said line of stroke;

operating said vibratory motors to rotate said eccentric weights, such that said rotating eccentric weights accumulatively synchronize and accumulatively add their output forces and their respective power outputs and thereby vibrate said bed along said line of stroke at a vibration frequency; and operating each said vibratory motor at substantially the same selected operating speed which approaches being equal to, or is less than, the natural frequency of said drive springs which are vibrating said bed.

14. The method of claim 13 including the step of operating said pair of vibratory motors located closest to said outlet end of said bed so as to provide a greater force output than the remainder of said pairs of vibratory motors.

15. The method of claim 13 including the step of uniformly adjusting the vibration frequency of said bed by electrically and simultaneously adjusting the rotational speed of each of said vibratory motors, while said vibratory motors continue to operate at substantially the same rotational speed with respect to one another.

16. The method of claim 13 including the step of adjusting the operating stroke and frequency of said drive springs and stabilizers by use of an electrical control connected to each said vibratory motor for simultaneously changing the rotational speed of said vibratory motors, while said vibratory motors continue to operate at substantially the same rotational speed with respect to one another.

17. The method of claim 13 wherein said first and second rotatable eccentric weights are rotated in opposite directions relative to one another, and said third and fourth rotatable eccentric weights are rotated in opposite directions relative to one another.

18. The vibratory conveying apparatus of claim 1 wherein said first and second rotatable eccentric weights are adapted to rotate in opposite directions relative to one another, and said third and fourth rotatable eccentric weights are adapted to rotate in opposite directions relative to one another.

19. The vibratory conveying apparatus of claim 1 wherein each said drive spring is sub-resonant tuned.

* * * * *